US012618268B2

(12) United States Patent
Chen et al.

(10) Patent No.: US 12,618,268 B2
(45) Date of Patent: May 5, 2026

(54) DOOR LOCK WITH BOTH MANUAL AND ELECTRIC UNLOCKING FUNCTIONS

(71) Applicant: Meta intelligence LLC, Dover, DE (US)

(72) Inventors: Jian Chen, Zhongshan (CN); Xifeng Wang, Zhongshan (CN)

(73) Assignee: Meta intelligence LLC, Dover, DE (US)

( * ) Notice: Subject to any disclaimer, the term of this patent is extended or adjusted under 35 U.S.C. 154(b) by 0 days.

(21) Appl. No.: 19/246,740

(22) Filed: Jun. 24, 2025

(65) Prior Publication Data

US 2026/0117562 A1 Apr. 30, 2026

(30) Foreign Application Priority Data

Oct. 25, 2024 (CN) ......................... 202422597567.3
Feb. 13, 2025 (CN) ......................... 202520232255.4

(51) Int. Cl.
*E05B 47/00* (2006.01)
*E05B 15/00* (2006.01)
*E05B 63/00* (2006.01)

(52) U.S. Cl.
CPC .......... *E05B 47/0012* (2013.01); *E05B 15/00* (2013.01); *E05B 63/0017* (2013.01); *E05B 2047/0017* (2013.01); *E05B 2047/002* (2013.01); *E05B 2047/0036* (2013.01);
(Continued)

(58) Field of Classification Search
CPC ...... E05B 47/00; E05B 47/0012; E05B 15/00; E05B 63/0017; E05B 2047/0017; E05B 2047/002; E05B 2047/0036; E05B 2047/0054; E05B 2047/0069;
(Continued)

(56) References Cited

U.S. PATENT DOCUMENTS 3,596,958 A * 8/1971 Bowerman ......... E05B 47/0038 292/201
4,099,755 A * 7/1978 Anderson ............... E05C 19/16 292/251.5
(Continued)

FOREIGN PATENT DOCUMENTS

CN 109989624 A * 7/2019 ............. E05B 15/00
CN 109372335 B 6/2020
DE 4222383 A1 * 1/1994 ........... E05B 1/0015

*Primary Examiner* — Suzanne L Barrett
(74) *Attorney, Agent, or Firm* — Bayramoglu Law Offices LLC

(57) ABSTRACT

A door lock with both manual and electric unlocking functions includes a lock body and a transmission rod. The lock body is provided with a latch for locking a door leaf. The transmission rod is in a transmission connection with the latch. When the transmission rod is manually or electrically driven to rotate forward or backward, the transmission rod is configured to drive the latch of the lock body to retract or extend, thereby achieving opening or closing of the door leaf. The door lock further includes a first housing, a rotating disc, and a rotating member. A misalignment device is arranged between the rotating disc and the rotating member. The misalignment device includes an idling area and a block, a controller, and a drive motor. The door lock further includes a positioning member fixedly arranged on the first housing.

13 Claims, 12 Drawing Sheets

(52) U.S. Cl.
CPC ................. *E05B 2047/0054* (2013.01); *E05B 2047/0069* (2013.01); *E05B 2047/0084* (2013.01)

(58) Field of Classification Search
CPC ......... E05B 2047/0084; Y10T 70/7113; Y10T 70/7119; Y10T 70/7124
USPC ........................................................ 70/279.1
See application file for complete search history.

(56) References Cited

U.S. PATENT DOCUMENTS 4,438,962 A * 3/1984 Soloviff .............. E05B 47/0012 292/144
5,443,570 A * 8/1995 Hirano ................. A01K 89/006 242/284
6,594,861 B2 * 7/2003 Dimig ..................... E05B 85/16 292/336.3
6,842,946 B2 * 1/2005 Hayden ................. E05B 1/0015 403/DIG. 1
8,522,482 B2 * 9/2013 Buck ..................... E05B 1/0069 49/386
10,145,143 B1 * 12/2018 Mohammed ............ E05C 19/16
11,927,044 B2 * 3/2024 Dallmann ............... E05F 11/16
11,946,305 B2 * 4/2024 Dallmann ............... E05F 11/16
2013/0192317 A1 * 8/2013 McKibben .............. E05B 47/02 292/144

* cited by examiner

DOOR LOCK WITH BOTH MANUAL AND ELECTRIC UNLOCKING FUNCTIONS

CROSS-REFERENCE TO THE RELATED APPLICATIONS

This application is based upon and claims priority to Chinese Patent Application No. 202422597567.3, filed on Oct. 25, 2024; and Chinese Patent Application No. 202520232255.4, filed on Feb. 13, 2025, the entire contents of which are incorporated herein by reference.

TECHNICAL FIELD

The present invention relates to the technical field of locks, and in particular to a door lock with both manual and electric unlocking functions.

BACKGROUND

In today's society, a preference for intelligent electronic products has become increasingly significant, and there is no shortage of intelligent electronic locks on the market. These locks typically rely on electric drive mechanisms to achieve unlocking and locking functions. Intelligence brings convenient and user-friendly experiences, but the imperceptible nature of lock management can lead to a lack of security among certain groups, especially the elderly, resulting in resistance to intelligent electronic locks. To balance the needs of different user groups, various locks with both manual and electric unlocking functions have emerged on the market. For example, Chinese Patent 201811178332.3 discloses a door lock assembly, and the door lock assembly includes a front key slot section, a rear controller section, and a latch section. The latch section includes a retractable latch. The front key slot section includes a lock head, and the lock head is provided with a keyhole for receiving a key and a driver. The key is configured to drive the latch to extend or retract by operating the driver 72. The rear controller section includes a motor, a transmission device, a driver coupling, and a user device, and the driver coupling and the user device respectively are radially linked to the driver. The transmission device includes a main gear with a recess. The driver coupling is received in the recess, and a gap is formed between the recess and the driver coupling, so that the driver coupling can rotate relative to the main gear by a certain angle. The front key slot section further includes a digital keypad, which is configured to be engaged with the motor to drive the latch to extend or retract when the correct password is provided. Thus, the operation of one or more of the keys, the user device, and the motor 80 causes the driver to change a position and actuate the latch.

SUMMARY

Upon detailed analysis of the door lock assembly disclosed in Patent 201811178332.3, it was found that significant wobbling occurs during the rotation of the driver coupling. This phenomenon causes users to experience a notable sense of insecurity. In view of deficiencies of the prior art, the present invention provides a door lock with both manual and electric unlocking functions, including a lock body and a transmission rod; the lock body is provided with a latch for locking a door leaf; the transmission rod is in a transmission connection with the latch; when the transmission rod is manually or electrically driven to rotate forward or backward, the transmission rod can drive the latch of the lock body to retract or extend, thereby achieving opening or closing of the door leaf; the door lock further includes a first housing, a rotating disc rotatably arranged on the first housing, and a rotating member; rotatory central lines of the transmission rod, the rotating disc, and the rotating member overlap; the transmission rod is in a transmission connection with the rotating member; a misalignment device is arranged between the rotating disc and the rotating member; the misalignment device includes an idling area and a block extending into the idling area; the block can move within the idling area; the idling area and the block are arranged at the rotating disc or the rotating member in an alternative manner; when the transmission rod is manually driven to rotate forward or backward, thereby driving the rotating member to rotate forward or backward, the idling area provides a sufficient moving space for the block, enabling the rotating member to rotate relative to the rotating disc; the door lock further includes a controller and a drive motor communicated with the controller; the drive motor is configured to drive the rotating disc to rotate and is fixed on the first housing; when the controller receives an indication signal for opening or closing a door, the controller can control the drive motor to drive the rotating disc to rotate forward or backward; the rotating disc rotating forward or backward can, with the help of the misalignment device, drive the rotating member to rotate forward or backward; the rotating member rotating forward or backward further drives the transmission rod to rotate forward or backward, thereby achieving the opening or closing of the door; the door lock further includes a positioning member fixedly arranged on the first housing; the positioning member is arranged above the rotating disc; the rotating member is arranged between the rotating disc and the positioning member; and the rotating disc and the positioning member provide axial positioning for the rotating member, and the rotating disc or the positioning member provides radial positioning for the rotating member.

Based on the above technical solutions, compared with the prior art, the beneficial technical effects of the present invention are as follows: since the rotating disc and the positioning member provide axial positioning for the rotating member, and the rotating disc or the positioning member provides radial positioning for the rotating member, when the transmission rod is manually driven to rotate forward or backward, thereby driving the rotating member to rotate forward or backward, the rotating disc and the positioning member significantly reduce the wobbling generated during the rotation of the rotating member. This enables the rotating member to rotate smoothly, thereby enhancing the sense of security for users.

Due to the aforementioned characteristics and advantages, the present invention can be applied to door locks with both manual and electric unlocking functions.

BRIEF DESCRIPTION OF THE DRAWINGS

FIG. 2A represents that a latch is in a retracted state, FIG. 2B represents that the latch is in an extended state by manually driving the transmission rod to rotate, and FIG. 2C represents that the latch is in an extended state by electrically driving the transmission rod to rotate.

DETAILED DESCRIPTION OF THE EMBODIMENTS

Figure 1:
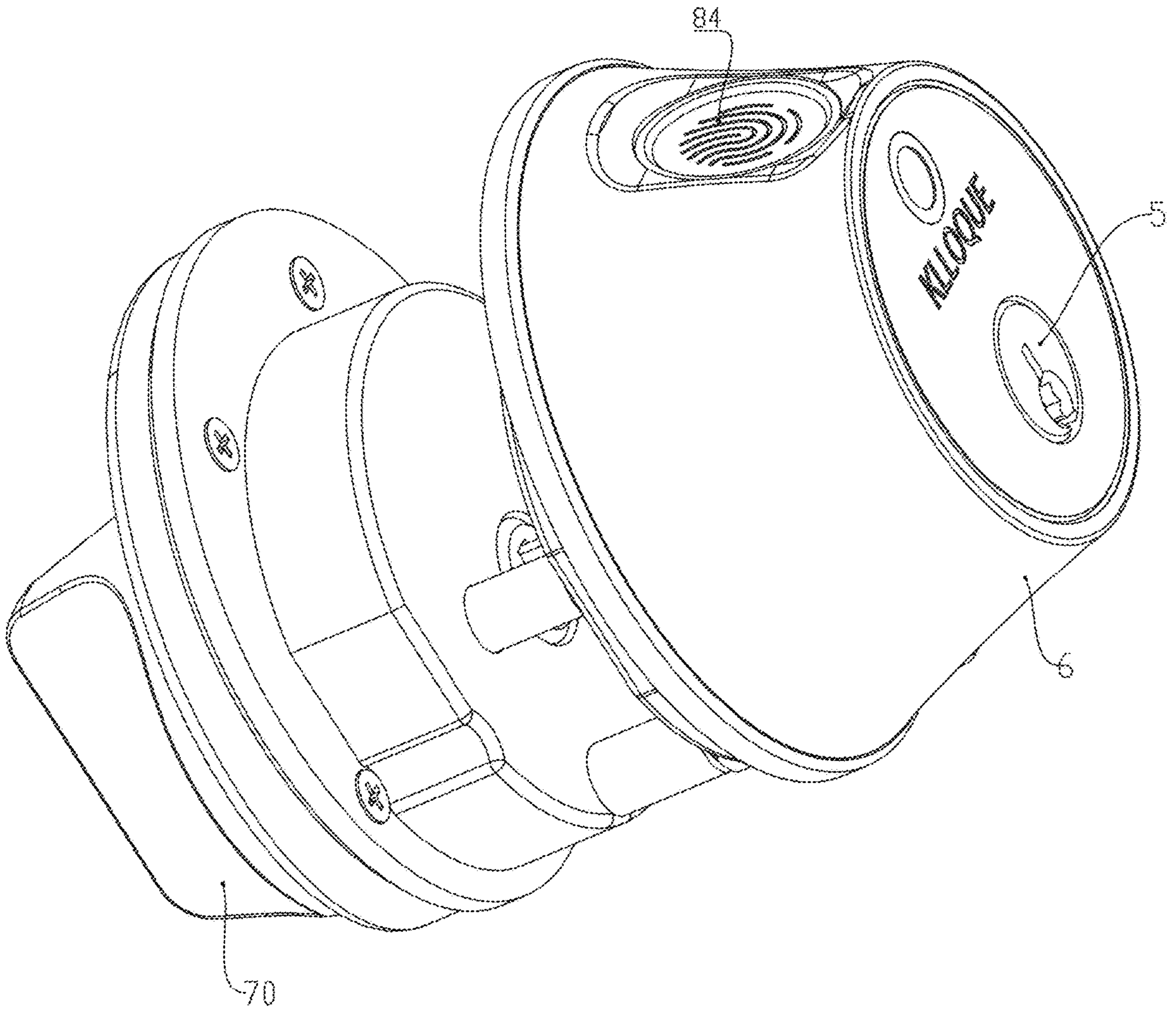
FIG. 1 is a perspective structural schematic diagram of a door lock with both manual and electric unlocking functions according to the technical solutions of the present invention.

The following provides a further explanation of the structure of the door lock with both manual and electric unlocking functions according to the technical solutions of the present invention, with reference to the drawings. Unless explicitly stated as equivalent or alternative embodiments, the various implementation details disclosed below can be selectively applied or combined in a single embodiment, even if they do not have direct functional relevance or synergistic relationships.

As shown in FIGS. 1 to 10, a door lock with both manual and electric unlocking functions includes the lock body 9 and the transmission rod 1. The lock body 9 is provided with the latch 90 for locking the door leaf 100. The transmission rod 1 is in a transmission connection with the latch 90. When the transmission rod 1 is manually or electrically driven to rotate forward or backward, the transmission rod 1 can drive the latch 90 of the lock body 9 to retract or extend, thereby achieving the opening or closing of the door leaf 100. The door lock further includes the first housing 6, the rotating disc 4 rotatably arranged on the first housing 6, and the rotating member 2. The rotatory central lines of the transmission rod 1, the rotating disc 4, and the rotating member 2 overlap. The transmission rod 1 is in a transmission connection with the rotating member 2. A misalignment device is arranged between the rotating disc 4 and the rotating member 2. The misalignment device includes the idling area 44 and the block 23 extending into the idling area 44. The block 23 can move within the idling area 44. The idling area 44 and the block 23 are arranged at the rotating disc 4 or the rotating member 2 in an alternative manner. When the transmission rod 1 is manually driven to rotate forward or backward, thereby driving the rotating member 2 to rotate forward or backward, the idling area 44 provides a moving space for the block 23, enabling the rotating member 2 to rotate relative to the rotating disc 4. The door lock further includes a controller (not shown in the figure) and the drive motor 88 communicated with the controller. The drive motor 88 is configured to drive the rotating disc 4 to rotate and is fixed on the first housing 6. When the controller receives an indication signal for opening or closing the door, it can control the drive motor 88 to drive the rotating disc 4 to rotate forward or backward. The rotating disc 4 rotating forward or backward can, with the help of the misalignment device, drive the rotating member 2 to rotate forward or backward. The rotating member 2 rotating forward or backward further drives the transmission rod 1 to rotate forward or backward, thereby achieving the opening or closing of the door. The door lock further includes the positioning member 3 fixedly arranged on the first housing 6. The positioning member 3 is arranged above the rotating disc 4. The rotating member 2 is arranged between the rotating disc 4 and the positioning member 3. The rotating disc 4 and the positioning member 3 provide axial positioning for the rotating member 2, and the rotating disc 4 or the positioning member 3 provides radial positioning for the rotating member 2.

The transmission rod 1 is in a transmission connection with the latch 90. The transmission connection between the transmission rod 1 and the latch 90 is diverse. For example, the handle 92 to be discussed below can be used as a power transmission component. The handle 92 is in a transmission connection with the transmission rod 1, and the handle 92 drives the latch 90 to retract or extend. The retraction or extension of the latch 90 is controlled by the transmission rod 1, and the driving mode of the transmission rod 1 includes two types: a manual driving mode and an electric driving mode. The manual driving mode can be implemented through the cooperation of a key and the lock cylinder 5 or the manual knob 70 to be discussed below.

The transmission rod 1 is in a transmission connection with the rotating member 2. The specific structure for achieving the transmission connection is diverse. For example, an insertion connector is arranged on the rotating member 2, and an insertion hole is formed in the transmission rod 1. The insertion connector is inserted into the insertion hole. In this embodiment, the insertion through hole 201 is formed in the rotating member 2. The shape of the insertion through hole 201 is consistent with the cross-sectional shape of the transmission rod 1. The transmission rod 1 passes through the insertion through hole 201 to be in a transmission connection with the rotating member 2. In this way, when the transmission rod 1 rotates forward or backward, it can synchronously drive the rotating member 2 to rotate forward or backward. Of course, in other technical solutions, the non-synchronous rotation of the transmission rod 1 and the rotating member 2 does not affect the implementation of this technical solution.

Figure 2C:
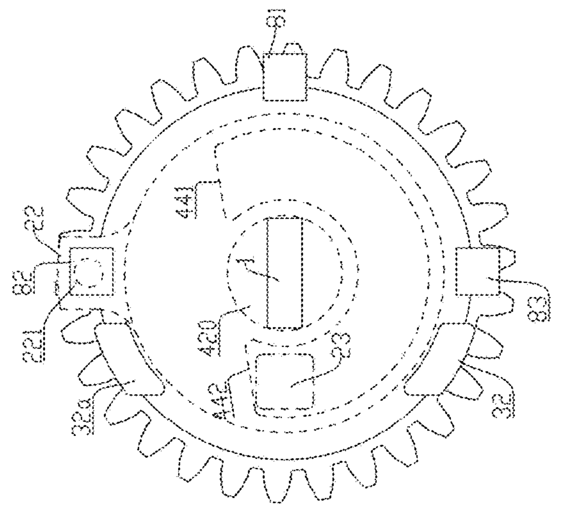
FIGS. 2A-2C show a positional relationship schematic diagram of the transmission rod, rotating disc, rotating member, positioning member, and position sensor when the door lock is installed on a door leaf, viewed from the outside to the inside of the door leaf. For ease of observation, the positioning member is simplified in the figure, showing only a pair of horns (32, 32*a*).
Figure 2B:
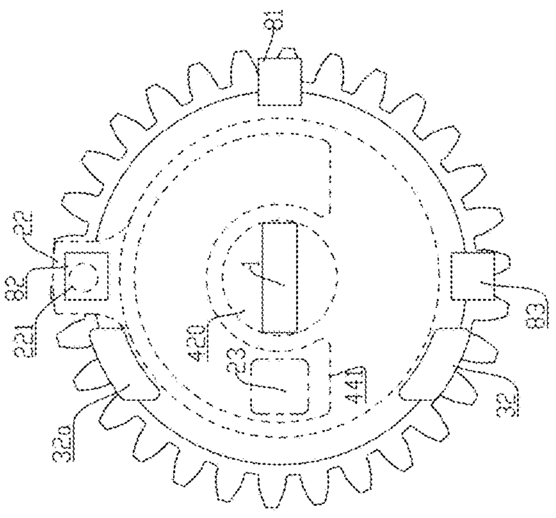
Figure 2A:
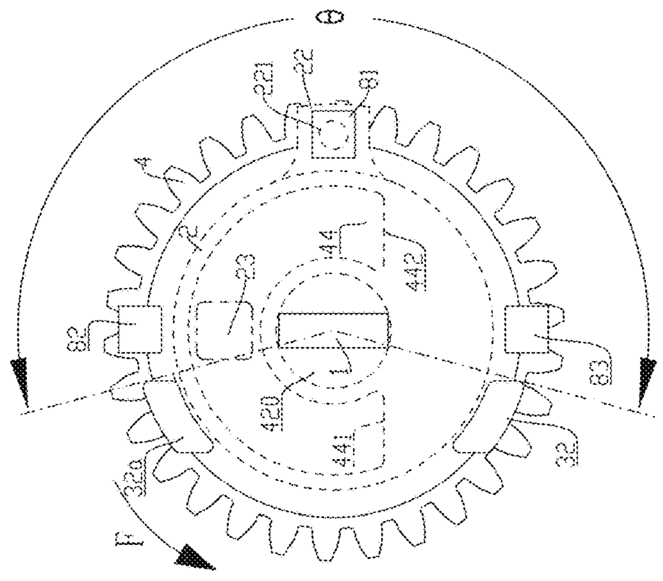
Figure 3:
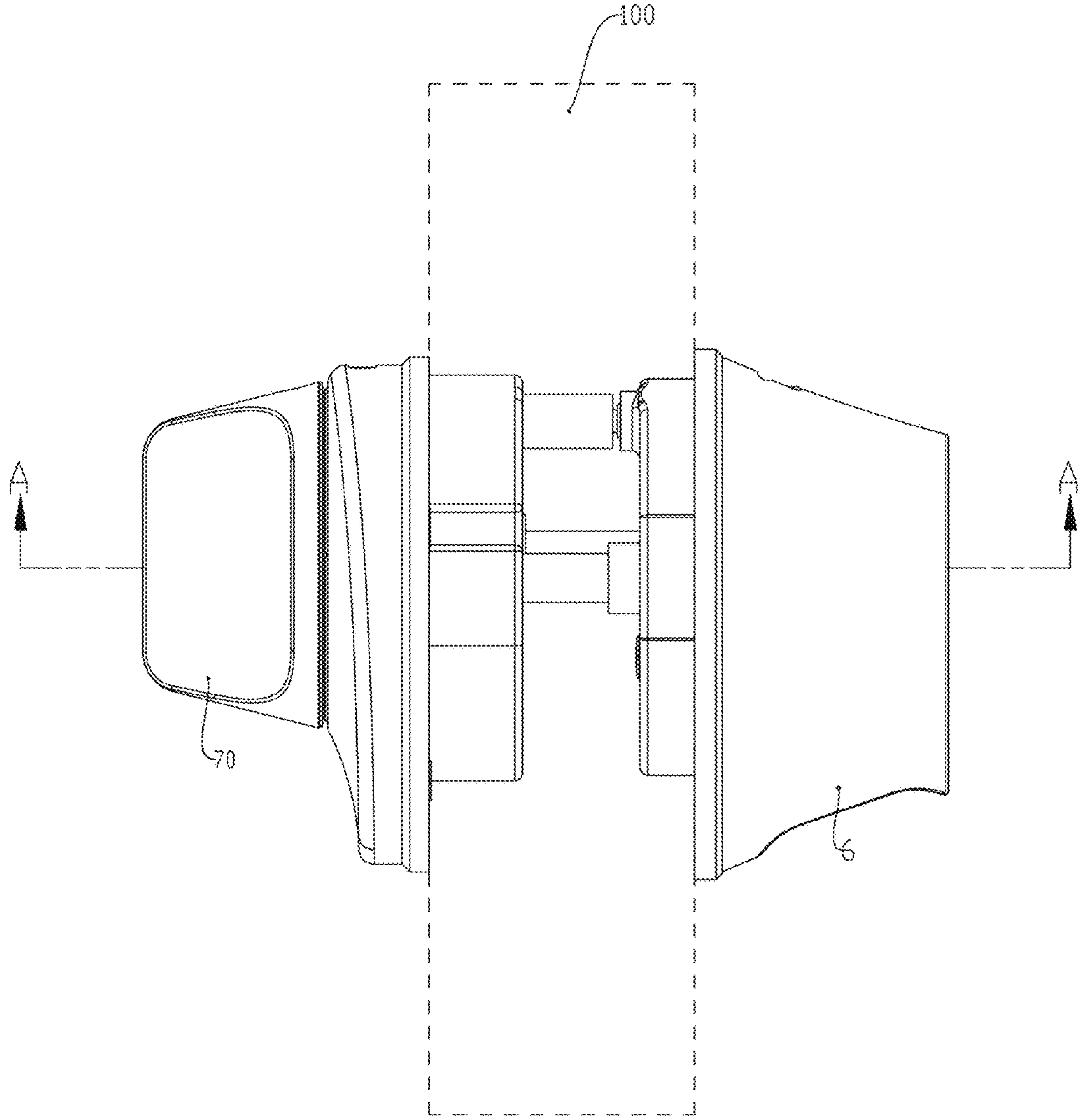
FIG. 3 is a side-view structural schematic diagram of the door lock, where the part circled by a dashed line represents the door leaf.

The idling area 44 and the block 23 are arranged at the rotating disc 4 or the rotating member 2 in an alternative manner. It can be understood that if the idling area 44 is arranged at the rotating disc 4, the block 23 is arranged on the rotating member 2; if the block 23 is arranged on the rotating disc 4, the idling area 44 is arranged at the rotating member 2. The size of the idling area 44 mainly depends on factors such as the moving range of the block 23 during the locking and unlocking processes, and whether the door lock is suitable for double-sided opening (applicable to both left-handed and right-handed opening. When viewed from outside the door, if the fixed hinge is installed on the left side of the door leaf 100, the door lock installed on the door leaf 100 needs to be suitable for left-handed opening; similarly, if the fixed hinge is installed on the right side of the door leaf, the door lock installed on the door leaf 100 needs to be suitable for right-handed opening) or single-sided opening (only applicable to one of left-handed and right-handed opening). As shown in FIG. 2A, in this embodiment, the door lock is suitable for double-sided opening. An arc-shaped groove is formed in the rotating disc 4. The center of the arc-shaped groove passes through the rotatory central line of the transmission rod 1. The central angle of the arc-shaped groove is 180±10°. The cavity inside the arc-shaped groove constitutes the idling area 44. The block 23 is arranged on the rotating member 2. When the latch 90 is retracted to be in a door-opening state, the block 23 is located in the middle position of the idling area 44. In this way, during the unlocking process, regardless of whether the block 23 moves left or right relative to the rotating disc 4, the idling area 44 provides a sufficient moving space for the block 23. Of course, in other embodiments, when the latch 90 is extended to be in the door-closing state, the block 23 is located in the middle position of the idling area 44. During the unlocking process, the idling area 44 provides a sufficient space for the block 23 to move left and right. If the door lock is suitable for single-sided opening, the central angle of the arc-shaped groove is changed to 90±10°. In the door-opening state or unlocking state, the block 23 is biased at one of the end positions on the arc-shaped groove.

Specifically, the rotating disc 4 is rotatably arranged on the first housing 6. In this embodiment, the first housing 6 includes the first upper housing 61 and the first lower housing 62. The bottom plate central hole 620 is formed in the first lower housing 62. The rotating disc 4 includes the driving disc 41 and the rotating shaft part 42 connected below the driving disc 41. The rotating shaft part 42 has the central shaft hole 420. The aperture of the central shaft hole 420 is larger than the rotation diameter of the transmission rod 1. The rotating shaft part 42 of the rotating disc 4 is rotatably installed in the bottom plate central hole 620, thereby achieving the rotatable installation of the rotating disc 4 on the first housing 6. One end of the transmission rod 1 passes through the central shaft hole 420 from the outside of the first housing 6 and is then connected to the rotating member 2. Since the aperture of the central shaft hole 420 is larger than the rotation diameter of the transmission rod 1, the transmission rod 1 cannot directly drive the rotating disc 4 to rotate, and the rotating disc 4 also cannot directly drive the transmission rod 1 to rotate. The transmission mechanism between the rotating disc 4 and the drive motor 88 is diverse. For example, an outer edge of the driving disc 41 is provided with the tooth grooves 43, and the small gear 46 is installed on the axial extending end of the drive motor 88. The drive motor 88 achieves deceleration through the engaged transmission of the small gear 46 and the tooth grooves 43 and drives the rotating disc 4 to rotate. The number of teeth of the small gear 46 is less than that of the rotating disc 4.

Specifically, the positioning member 3 is fixedly arranged and does not move with the rotation of the transmission rod 1, the rotating disc 4, and the rotating member 2. In this embodiment, the positioning member 3 has the annular body 31, and the annular body 31 is provided with the annular hole 310. The annular body 31 is combined with the rotating member 2 and provides axial positioning for the rotating member 2 from above. The door lock further includes the lock cylinder 5, and the lock cylinder 5 is positioned in the annular hole 310. The lock cylinder 5 includes a cylinder housing (not shown in the figure) and a bolt (not shown in the figure) arranged inside the cylinder housing. When a legal key is inserted into the bolt and turned with force, the bolt is unlocked and can rotate inside the cylinder housing. One end of the transmission rod 1 passes through the rotating member 2 and is then connected to the bolt. The bolt and the transmission rod 1 are not synchronously rotated, and the non-synchronous rotation range has a central angle of greater than or equal to 90° but not exceeding 180° (the specific structure can be similar to the structure of the misalignment device, which can be understood by referring to the misalignment device). The rotatory central lines of the bolt, the transmission rod 1, the rotating member 2, and the rotating disc 4 overlap. In this embodiment, the non-synchronous rotation range has a central angle of 180°, and the transmission rod 1 can rotate 90° forward and backward relative to the bolt. Furthermore, the rotating member groove 20 is arranged at the upper end of the rotating member 2 (the insertion through hole 201 is formed in the bottom wall of the rotating member groove 20). The annular body 31 of the positioning member 3 extends into the rotating member groove 20 and presses against the bottom wall of the rotating member groove 20. The annular body 31 of the positioning member 3 provides axial positioning for the rotating member 2 from above. The disc groove 45 is arranged at the upper end of the rotating disc 4 (the idling area 44 is arranged at the bottom wall of the disc groove 45). The lower end of the rotating member 2 extends into the disc groove 45 and is positioned radially and axially downward by the inner wall of the disc groove 45. Of course, in other embodiments, the positioning member 3 can also provide radial positioning for the rotating member 2.

Furthermore, a pair of horns (32, 32*a*) for positioning are arranged on both sides of the outer side of the annular body 31 of the positioning member 3. The extension arm 22 is arranged on the rotating member 2. The extension arm 22 extends into the space between the pair of horns (32, 32*a*). When the rotating member 2 rotates forward or backward to allow the extension arm 22 to abut against one of the horns, the rotating member 2 also drives the transmission rod 1 to rotate forward or backward, thereby allowing the latch 90 to be in a retracted state or an extended state. At this time, the extension arm 22 moves to a position that synchronously represents the latch 90 in the retracted state or the extended state. The pair of horns (32, 32*a*) are fixedly arranged and do not move with the rotation of the transmission rod 1, the rotating disc 4, and the rotating member 2. By using the pair of horns (32, 32*a*) to limit the extension arm 22, the rotation range of the transmission rod 1 and the rotating member 2 is also affected, thereby increasing the difficulty of destructive unlocking of the door lock. The pair of horns (32, 32*a*) belong to a part of the positioning member 3. By fixing the positioning member 3, the pair of horns (32, 32*a*) can be fixed, thereby facilitating the simplification of the structure and installation steps of the door lock. In this embodiment, as shown in FIG. 2A, the door lock is suitable for double-sided opening. The central angle θ of the pair of horns (32, 32*a*) is approximately 190°. When the latch 90 is retracted to be in the door-opening state, the extension arm 22 is located in the middle position between the pair of horns (32, 32*a*). After the user selects to configure the door lock as a left-handed or right-handed opening mode according to application needs, under the action of the transmission rod 1 and the lock body 9, the rotation angle of the extension arm 22 is approximately 90°. The specific reasons will be discussed in detail below.

To monitor the extension and retraction state of the latch 90, the door lock further includes a position sensor and the trigger 221 for matching use. The trigger 221 is arranged on the extension arm 22. When the extension arm 22 moves to a position representing the latch 90 in the retracted state or the extended state, the position sensor is triggered by the trigger 221 and sends a corresponding position signal to the controller, and the controller controls the drive motor 88 to stop based on the position signal. The door lock further includes the circuit board 8, and the circuit board 8 is arranged above the rotating member 2 and fixedly connected to the first housing 6. The position sensor is arranged on the circuit board 8. The circuit board 8 is provided with the avoidance hole 801. The circuit board 8 is sleeved on the annular body 31 of the positioning member 3 through the avoidance hole 801, so that the trigger 221 can approach the position sensor. When the door lock is a single-sided opening structure (only applicable to left-handed or right-handed opening), the number of position sensors is set to two. When the door lock is a double-sided opening structure (applicable to left-handed and right-handed opening), the number of position sensors is set to three. From a top view (where "top view" can be understood as the observation direction perpendicular to the door leaf 100 when the door lock is installed on the door leaf 100), as shown in FIGS. 2A-2C, in this embodiment, the position sensors include the first position sensor 81, the second position sensor 82, and the third position sensor 83. The second position sensor 82 and the third position sensor 83 are symmetrically arranged on both sides of the first position sensor 81, and the second position sensor 82 and the third position sensor 83 are arranged in front of the pair of horns (32, 32*a*). If left-handed opening is selected, the first position sensor 81 and the second position sensor 82 detect the position of the extension arm 22. If right-handed opening is selected, the first position sensor 81 and the third position sensor 83 detect the position of the extension arm 22.

Figure 4:
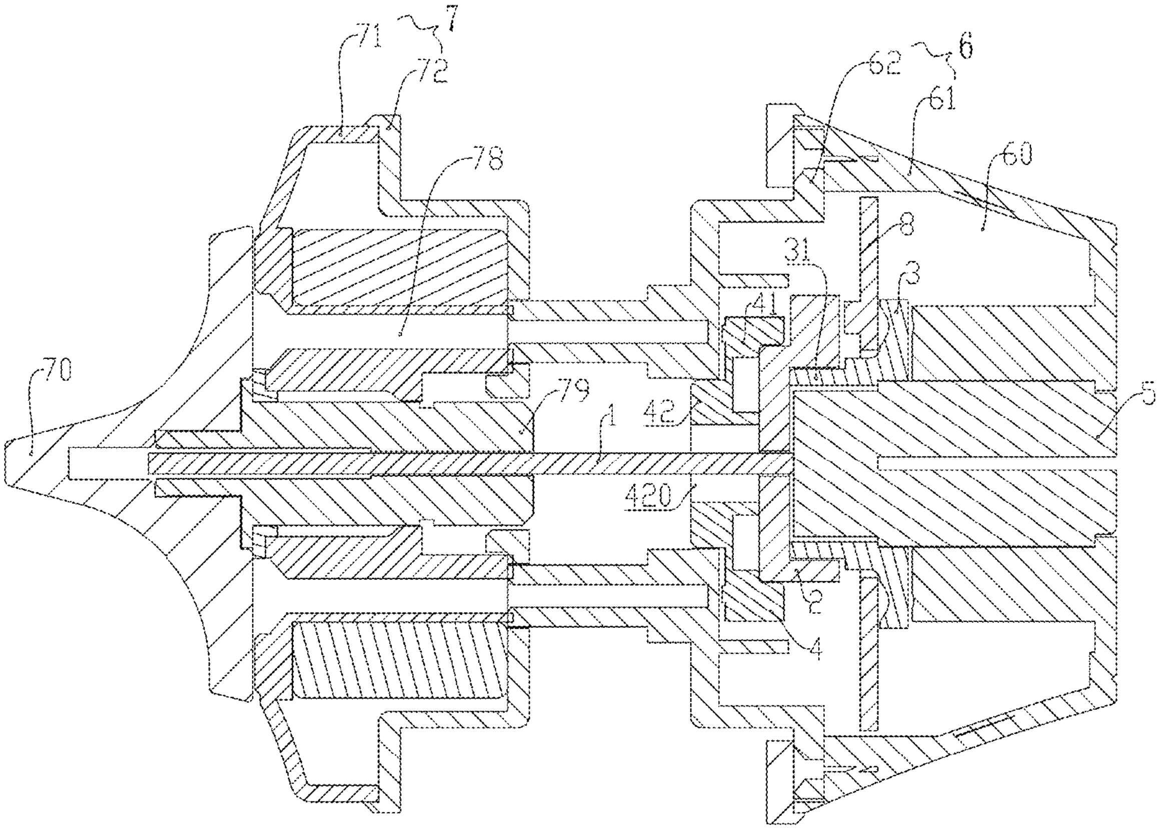
FIG. 4 is a cross-sectional structural schematic diagram along the A-A direction in FIG. 3.
Figure 10:
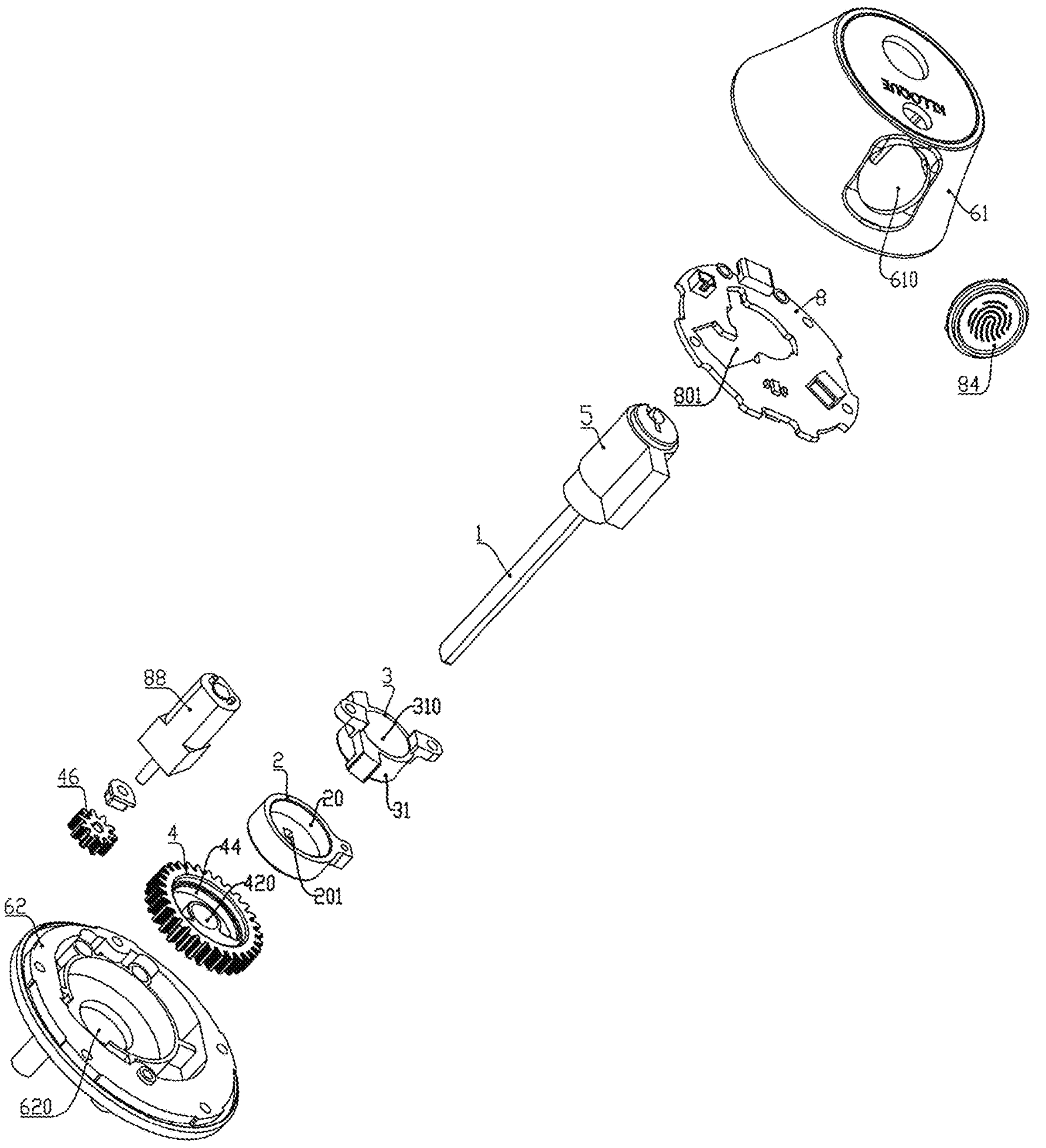
FIG. 10 is an exploded structural schematic diagram of the outside-door module.

Furthermore, as shown in FIGS. 4 and 10, the door lock further includes an outside-door module. The outside-door module includes the first housing 6, the rotating disc 4, the rotating member 2, the positioning member 3, the circuit board 8, the lock cylinder 5, and the drive motor 88. The first housing 6 includes the first upper housing 61 and the first lower housing 62. The first upper housing 61 and the first lower housing 62 are mutually fastened together to form the accommodation cavity 60 between them. The rotating disc 4, the rotating member 2, the positioning member 3, the circuit board 8, the lock cylinder 5, and the drive motor 88 are accommodated in the accommodation cavity 60. The rotating disc 4 is rotatably arranged on the bottom plate central hole 620 of the first lower housing 62. The rotating member 2 is rotatably arranged on the rotating disc 4. The drive motor 88 is fixed on the first upper housing 61. The first housing 6 is configured to be attached to and installed on the outer side of the door leaf 100. The first housing 6 is fixedly installed on the door leaf and cannot be twisted and rotated. The first housing 6 is further provided with the biometric recognition device 84 (such as a fingerprint recognition device, a finger vein recognition device, etc.) configured for receiving an unlocking instruction and electrically connected to the controller. The first upper housing 61 is provided with the face cover hole 610, and the receiving window of the biometric recognition device 84 is arranged at the position of the face cover hole 610. As shown in FIG. 4, the rotating shaft part 42 of the rotating disc 4 is rotatably arranged on the bottom plate central hole 620 of the first lower housing 62. The lower end of the rotating member 2 extends into the disc groove 45 of the rotating disc 4 and can rotate relative to the rotating disc 4.

In addition to manually driving the transmission rod 1 to rotate through the cooperation of a key (not shown in the figure) and the lock cylinder 5, the present invention also proposes the following manual driving method. As shown in FIG. 4, the door lock further includes an inside-door module. The inside-door module includes the second housing 7. The second housing 7 includes the second base plate 72 and the second face cover plate 71 that are mutually fastened together. The manual knob 70 is installed on the second face cover plate 71. The manual knob 70 is in a transmission connection with one end of the transmission rod 1. When the manual knob 70 is manually rotated inside the door, it can drive the transmission rod 1 to rotate forward or backward, thereby driving the latch 90 to retract or extend.

Figure 11:
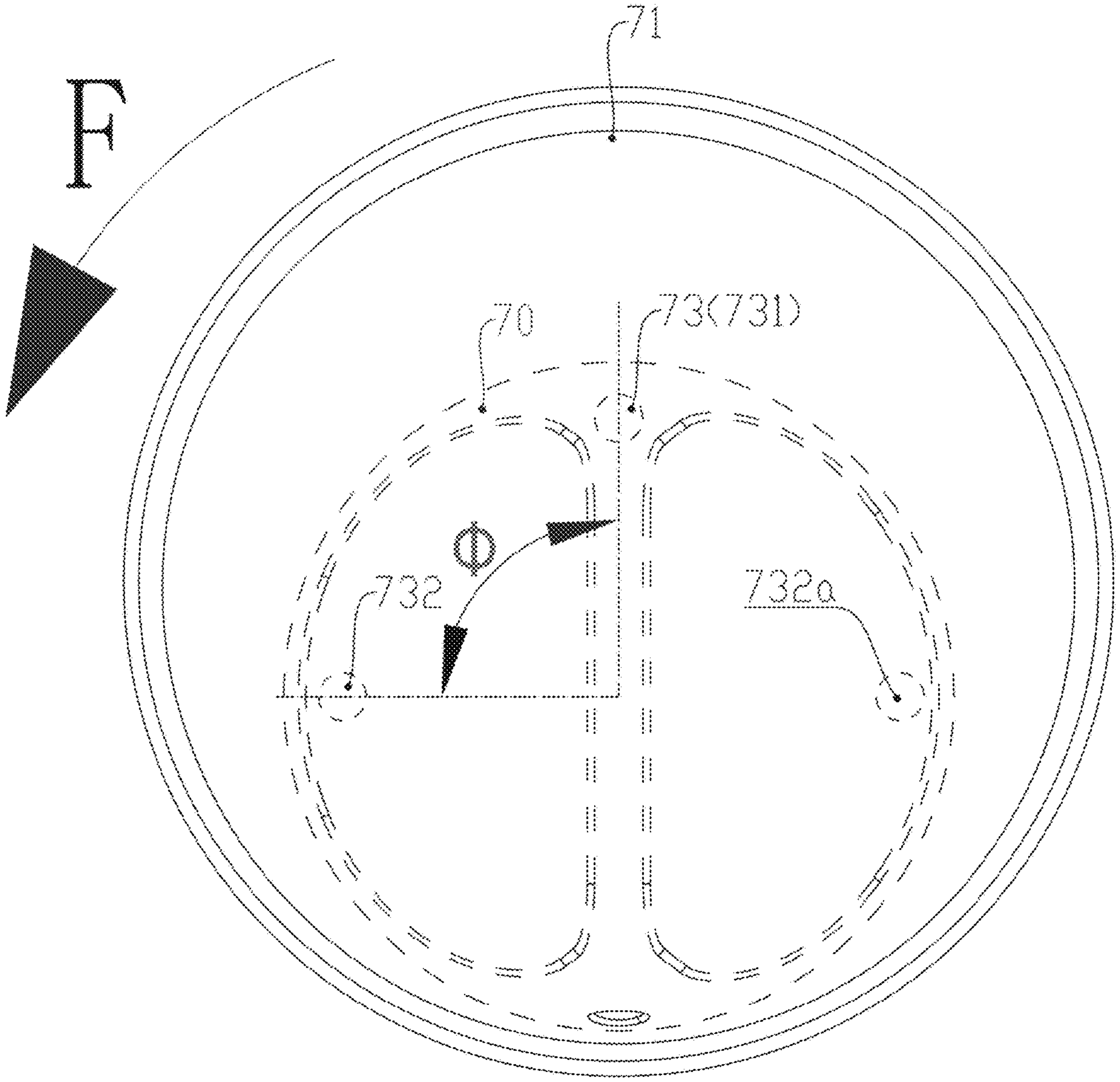
FIG. 11 is a positional relationship schematic diagram of the inside-door module, manual knob, main magnetic component, and secondary magnetic group when the door lock is installed on the door leaf, viewed from the outside to the inside of the door leaf. The dashed lines in the figure represent the manual knob, the main magnetic component, and the secondary magnetic group, respectively.
Figure 12:
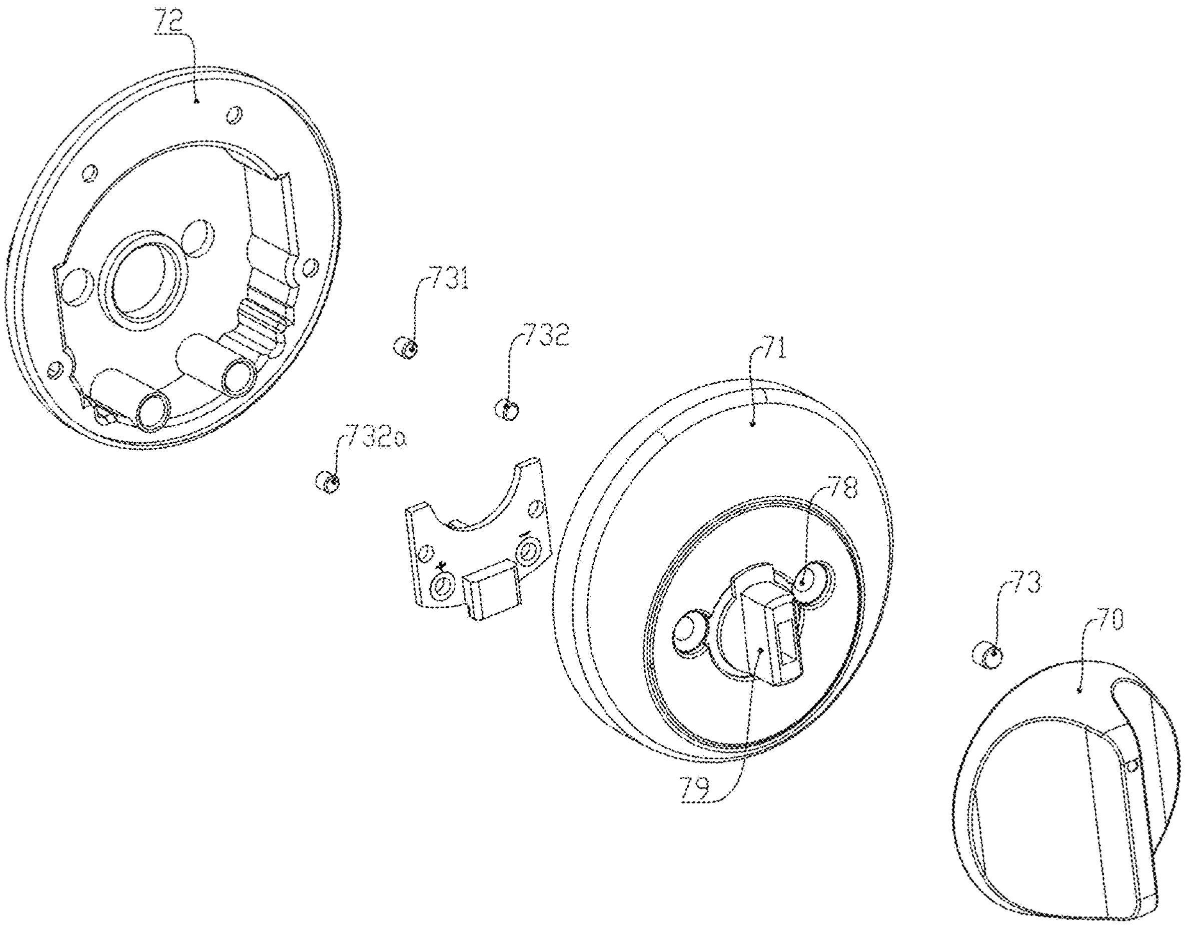
FIG. 12 is an exploded structural schematic diagram of the inside-door module.

As shown in FIGS. 11 and 12, to enable the manual knob 70 to stay at a position where the latch 90 is retracted or extended, the door lock further includes the main magnetic component 73 and a secondary magnetic group. The main magnetic component 73 and the secondary magnetic group are arranged on the inside-door module or the manual knob 70 in an alternative manner. The secondary magnetic group includes the first magnetic component 731 and the second magnetic component 732, which can be magnetically paired with the main magnetic component 73, respectively. From a top view, the first magnetic component 731 and the second magnetic component 732 are spaced apart. The first magnetic component 731 is configured to be magnetically absorbed to the main magnetic component 73 when the manual knob 70 is rotated to a position for driving the latch 90 to retract, thereby keeping the manual knob 70 at this position. The second magnetic component 732 is configured to be magnetically absorbed to the main magnetic component 73 when the manual knob 70 is rotated to a position for driving the latch 90 to extend, thereby keeping the manual knob 70 at this position. When the door lock is a single-sided opening structure, only one second magnetic component 732 needs to be set. In this embodiment, when the door lock is a double-sided opening structure, a pair of second magnetic components (732, 732*a*) are further included. From a top view as shown in FIG. 11, the pair of second magnetic components (732, 732*a*) are located on a straight line and are spaced apart on both sides of the first magnetic component 731. The first magnetic component 731 is located on a straight line perpendicular to the line connecting the pair of second magnetic components (732, 732*a*) and passing through the midpoint of the line. The central angle, taking the rotatory central line passing through the manual knob 70 as a circle center, between the first magnetic component 731 and any one of the second magnetic components 732 is Φ. The rotatory central lines of the manual knob 70, the transmission rod 1, the rotating disc 4, and the rotating member 2 overlap. In this embodiment, the main magnetic component 73 is arranged on the manual knob 70. The first magnetic component 731 and the second magnetic components (732, 732*a*) are arranged on the second face cover plate 71 of the inside-door module. The central angle Φ, taking the rotatory central line passing through the manual knob 70 as a circle center, between the first magnetic component 731 and any one of the second magnetic components (732 or 732*a*) is 90°. In the state shown in FIG. 11, the main magnetic component 73 is magnetically absorbed to the first magnetic component 731, thereby keeping the manual knob 70 in a vertical state, and the latch 90 is in a retracted state at this time. When the manual knob 70 is rotated to drive the main magnetic component 73 to rotate to approach the second magnetic component 732, the main magnetic component 73 is magnetically absorbed to the second magnetic component 732, thereby keeping the manual knob 70 in a horizontal state, and the latch 90 is in an extended state at this time. In other embodiments, a pair of first magnetic components 731 can be further included. From a top view, the pair of first magnetic components 731 are located on a straight line and are spaced apart on both sides of the second magnetic component 732. The second magnetic component 732 is located on a straight line perpendicular to the line connecting the pair of first magnetic components 731 and passing through the midpoint of the line. The central angle, taking the rotatory central line passing through the manual knob 70 as a circle center, between the second magnetic component 732 and any one of the first magnetic components 731 is Φ.

Figure 5:
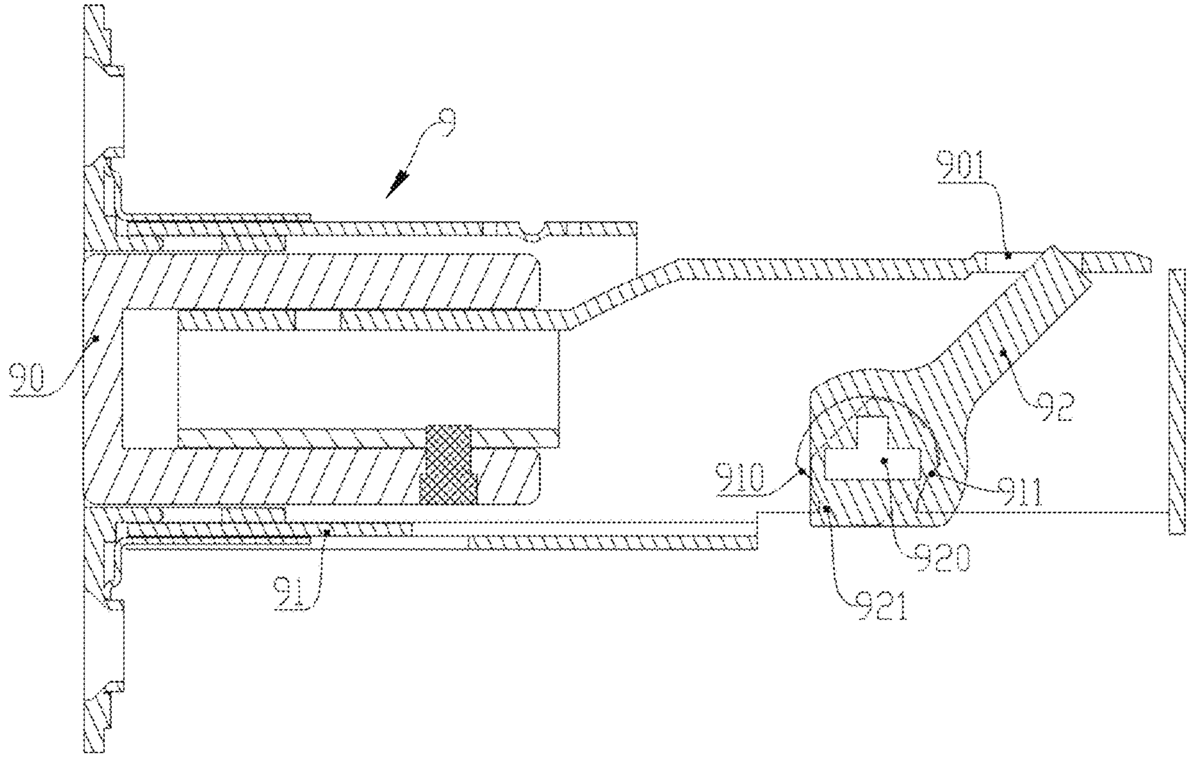
FIG. 5 is a cross-sectional structural schematic diagram of a lock body.
Figure 6:
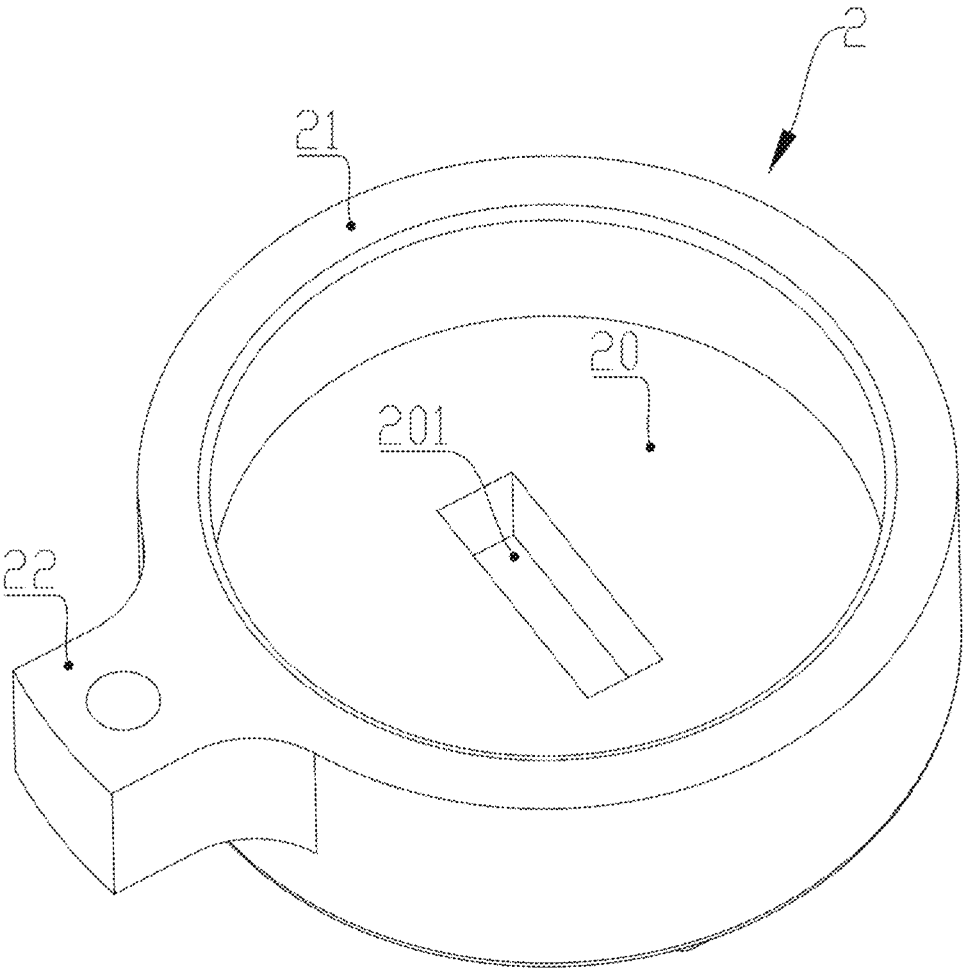
FIG. 6 is a perspective structural schematic diagram of the rotating member.
Figure 7:
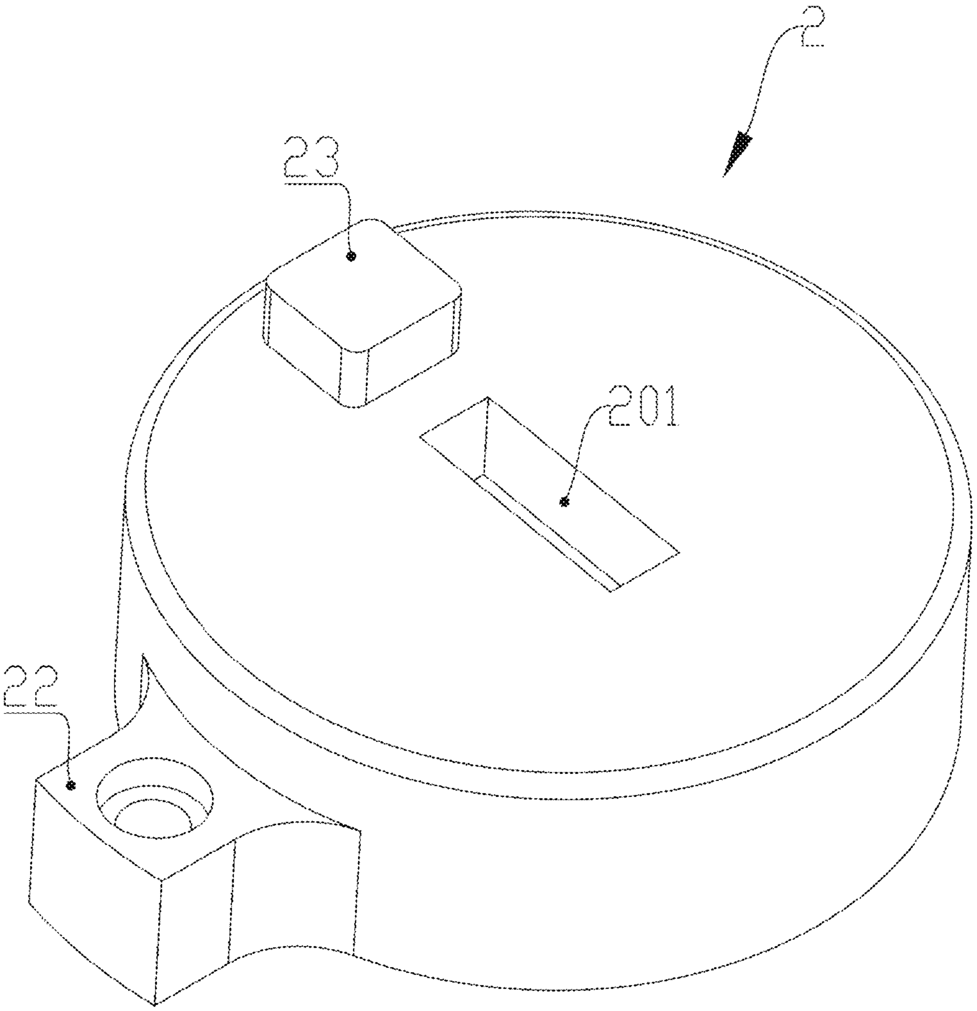
FIG. 7 is a perspective structural schematic diagram of the rotating member in FIG. 6 after being flipped over.
Figure 8:
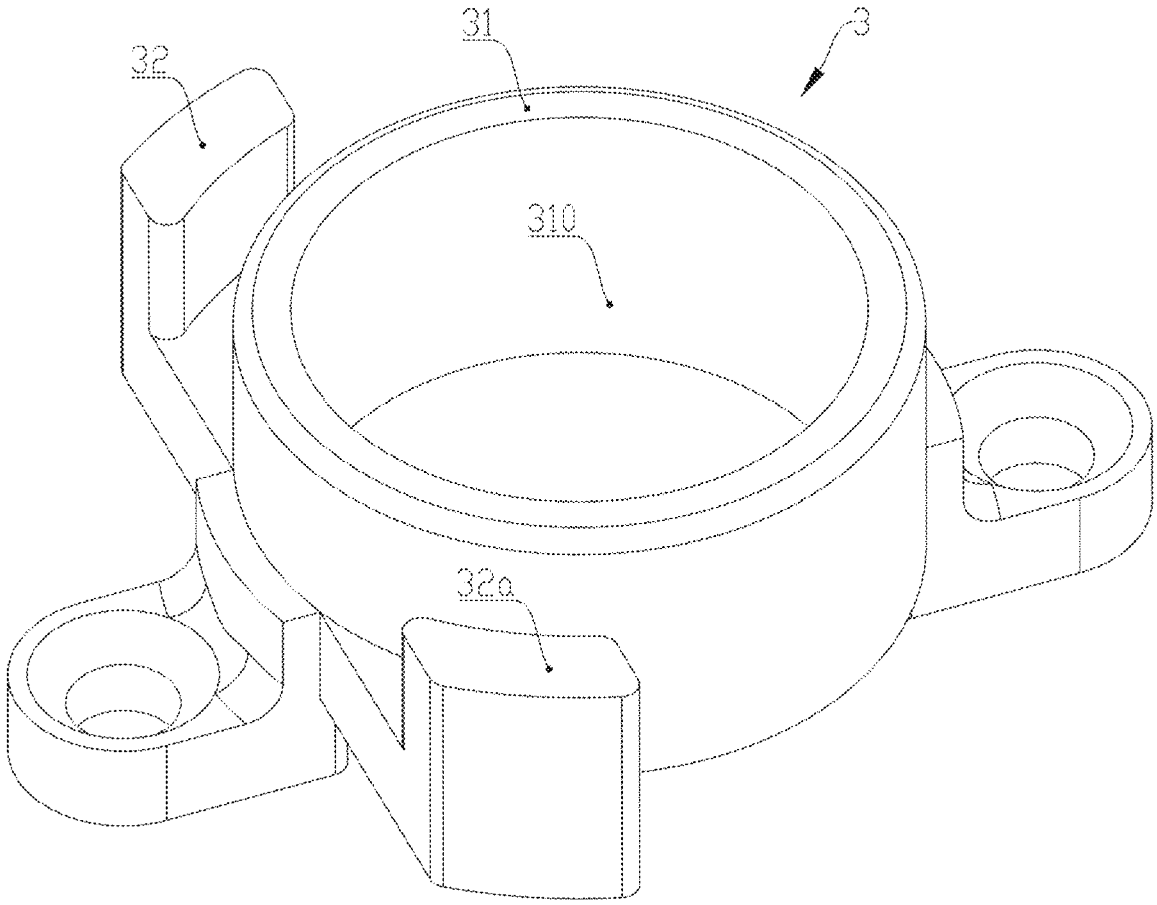
FIG. 8 is a perspective structural schematic diagram of the positioning member.
Figure 9:
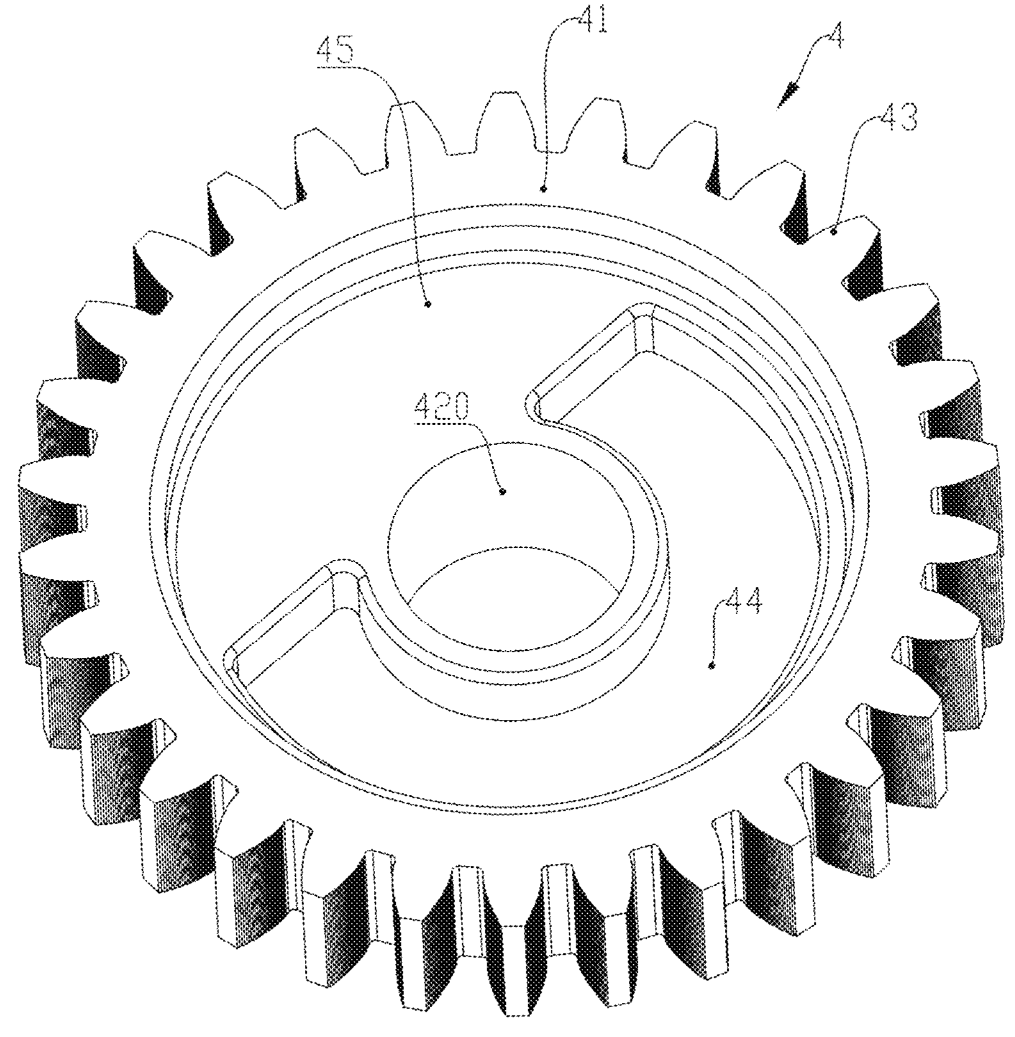
FIG. 9 is a perspective structural schematic diagram of the rotating disc.

As shown in FIG. 5, the lock body 9 further includes the handle 92 for pushing the latch 90 to retract or extend. The handle 92 is in a transmission connection with the transmission rod 1. The lock body 9 further includes a limiting mechanism, and the limiting mechanism can constrain the handle 92 to swing within an angle range of 0 to 10 degrees added based on Φ. For example, when Φ is 90°, the limiting mechanism can constrain the handle 92 to swing within an angle range of 90°, 91°, 93°, and 100°. In this embodiment, the lock body 9 further includes the lock housing 91. The limiting mechanism includes a pair of limiting walls (910, 911) arranged on the lock housing 91 on the left and right. One end of the handle 92 is provided with the limiting protrusion 921, and the limiting protrusion 921 extends into the space between the pair of limiting walls (910, 911). The limiting mechanism can constrain the handle 92 to swing within an angle range of 91°. The connection hole 901 is arranged at the tail of the latch 90. The other end of the handle 92 is inserted into the connection hole 901, thereby driving the latch 90 to extend or retract. The handle 92 is also provided with the handle through hole 920, and the transmission rod 1 is inserted into the handle through hole 920. In this way, under the constraint of the limiting mechanism, the rotation angle range of the transmission rod 1 is also 91°, thereby allowing the rotation angle range of the manual knob 70, the rotating member 2, and the extension arm 22 on the rotating member 2 that are in a transmission connection with the transmission rod 1 also to be 91°, and not freely rotatable by 180°. When it is necessary to switch the opening direction of the door lock, for example, from left-handed opening to right-handed opening, the installation orientation of the lock body 9 needs to be adjusted accordingly.

As shown in FIGS. 4 and 12, the connection through hole 78 is formed in the second face cover plate 71 of the second housing 7. A fastening bolt (not shown in the figure) is further provided. The fastening bolt is configured to pass through the connection through hole 78 to connect the outside-door module and the inside-door module together and fix them to the door leaf 100. When the manual knob 70 is installed on the outside-door module, it covers the connection through hole 78. In this way, the exposure of the connection through hole 78 can be avoided, so as not to damage the appearance of the door lock. The insertion seat 79 is rotatably arranged on the second face cover plate 71. The transmission rod 1 is inserted into the insertion seat 79, and the manual knob 70 is installed on the insertion seat 79 through a locking screw.

The following describes the manual and electric locking methods of the door lock in detail with reference to FIGS. 2A-2C. In this embodiment, the door lock is a left-handed opening structure. First, the manual locking method is introduced: in the state shown in FIG. 2A, it represents that the latch 90 is already retracted, the door lock is in an unlocking state, and the door leaf 100 can be opened. By the cooperation of the key and the lock cylinder 5 or by the manual knob 70, the transmission rod 1 is driven to rotate in the backward direction (the direction indicated by the arrow F in FIG. 2A) to drive the rotating member 2 to rotate in the backward direction. The block 23 moves left relative to the rotating disc 4 within the idling area 44 as the rotating member 2 rotates. When the extension arm 22 of the rotating member 2 abuts against the horn 32*a*, as shown in FIG. 2B, it represents that the latch 90 is in an extended state, and the door leaf 100 can be closed. At this time, the block 23 does not abut against the left wall 441 of the arc-shaped groove, so as to drive the rotating disc 4 to rotate. Therefore, in this process, the rotating disc 4 does not hinder the rotation of the rotating member 2. During the manual driving of the transmission rod 1, it is not necessary to bear the hindering force from the rotating disc 4, which is conducive to optimizing the hand feel. Then, by the cooperation of the key and the lock cylinder 5 or by the manual knob 70, the transmission rod 1 is driven to rotate in the forward direction. The block 23 moves right relative to the rotating disc 4 within the idling area 44 to be restored as the rotating member 2 rotates, and at the same time, the transmission rod 1 drives the latch 90 to retract again, thereby achieving the opening of the door and returning to the state shown in FIG. 2A.

The electric locking method is introduced as follows: when the controller receives an indication signal for closing the door, it can control the drive motor 88 to drive the rotating disc 4 to rotate in the backward direction (the direction indicated by the arrow F in FIG. 2A). The rotating disc 4 rotates in the backward direction and abuts against the block 23 through the right wall 442 of the arc-shaped groove, thereby driving the rotating member 2 to rotate in the backward direction. The rotating member 2 rotating in the backward direction further drives the transmission rod 1 to rotate in the backward direction. When the extension arm 22 of the rotating member 2 abuts against the horn 32*a*, as shown in FIG. 2C, it represents that the latch 90 is in an extended state. At this time, the trigger 221 on the extension arm 22 triggers the second position sensor 82 to send a corresponding position signal to the controller, and the controller controls the drive motor 88 to stop based on the position signal, thereby achieving the closing of the door. Then, when the controller receives an indication signal for opening the door, it can control the drive motor 88 to drive the rotating disc 4 to rotate in the forward direction. The rotating disc 4 rotates in the forward direction and abuts against the block 23 through the left wall 441 of the arc-shaped groove, thereby driving the rotating member 2 to rotate in the forward direction. The rotating member 2 rotating in the forward direction further drives the transmission rod 1 to rotate in the forward direction. When the trigger 221 on the extension arm 22 triggers the first position sensor 81 to send a corresponding position signal to the controller, the controller controls the drive motor 88 to stop based on the position signal, thereby achieving the opening of the door.

What is claimed is:

1. A door lock with both manual and electric unlocking functions, comprising a lock body and a transmission rod; wherein the lock body is provided with a latch for locking a door leaf; the transmission rod is in a transmission connection with the latch; when the transmission rod is manually or electrically driven to rotate forward or backward, the transmission rod is configured to drive the latch of the lock body to retract or extend, wherein opening or closing of the door leaf is achieved;

the door lock further comprises a first housing, a rotating disc rotatably arranged on the first housing, and a rotating member; wherein rotatory central lines of the transmission rod, the rotating disc, and the rotating member overlap; the transmission rod is in a transmission connection with the rotating member; a misalignment device is arranged between the rotating disc and the rotating member; the misalignment device comprises an idling area and a block extending into the idling area; the block is configured to move within the idling area; the idling area and the block are arranged at the rotating disc or the rotating member in an alternative manner; when the transmission rod is manually driven to rotate forward or backward, and the rotating member is driven to rotate forward or backward, the idling area provides a moving space for the block, enabling the rotating member to rotate relative to the rotating disc;

the door lock further comprises a controller and a drive motor communicated with the controller; the drive motor is configured to drive the rotating disc to rotate and is fixed on the first housing; when the controller receives an indication signal for opening or closing a door, the controller is configured to control the drive motor to drive the rotating disc to rotate forward or backward; the rotating disc rotating forward or backward is configured to, with a help of the misalignment device, drive the rotating member to rotate forward or backward; the rotating member rotating forward or backward further drives the transmission rod to rotate forward or backward, wherein the opening or closing of the door is achieved; and the door lock further comprises a positioning member fixedly arranged on the first housing; wherein the rotating member is arranged between the rotating disc and the positioning member; and the rotating disc and the positioning member provide axial positioning for the rotating member, and the rotating disc or the positioning member provides radial positioning for the rotating member.

2. The door lock according to claim 1, wherein when the latch is retracted to be in a door-opening state, the block is located in a middle position of the idling area, and during a locking process, the idling area provides a space for the block to move left and right; or when the latch is extended to be in a door-closing state, the block is located in the middle position of the idling area, and during an unlocking process, the idling area provides a space for the block to move left and right.

3. The door lock according to claim 1, wherein a bottom plate central hole is formed in the first housing; the rotating disc comprises a driving disc and a rotating shaft part connected below the driving disc; the rotating shaft part has a central shaft hole; an aperture of the central shaft hole is larger than a rotation diameter of the transmission rod; the rotating shaft part of the rotating disc is rotatably installed in the bottom plate central hole of the first housing, wherein a rotatable installation of the rotating disc on the first housing is achieved; and an end of the transmission rod passes through the central shaft hole from an outside of the first housing and is connected to the rotating member.

4. The door lock according to claim 3, wherein an outer edge of the driving disc is provided with tooth grooves, and a small gear is installed on an axial extending end of the drive motor; the drive motor achieves deceleration through engaged transmission of the small gear and the tooth grooves and drives the rotating disc to rotate.

5. The door lock according to claim 3, wherein the positioning member has an annular body, and the annular body is provided with an annular hole; the annular body is combined with the rotating member and provides axial positioning for the rotating member from above; the door lock further comprises a lock cylinder, and the lock cylinder is positioned in the annular hole; the lock cylinder comprises a cylinder housing and a bolt arranged inside the cylinder housing;

when a legal key is inserted into the bolt and turned with force, the bolt is unlocked and configured to rotate inside the cylinder housing; the end of the transmission rod passes through the rotating member and is connected to the bolt; the bolt and the transmission rod are not synchronously rotated, and a non-synchronous rotation range has a central angle of greater than or equal to 90° and less than or equal to 180°; and rotatory central lines of the bolt, the transmission rod, the rotating member, and the rotating disc overlap.

6. The door lock according to claim 5, wherein a pair of horns for positioning are arranged on both sides of an outer side of the annular body of the positioning member; an extension arm is arranged on the rotating member; the extension arm extends into a space between the pair of horns; when the rotating member rotates forward or backward to allow the extension arm to abut against one of the pair of horns, the rotating member further drives the transmission rod to rotate forward or backward, wherein the latch is allowed to be in a retracted state or an extended state; and wherein the extension arm moves to a position that synchronously represents the latch in the retracted state or the extended state.

7. The door lock according to claim 6, further comprising a position sensor and a trigger for matching use; the trigger is arranged on the extension arm; when the extension arm moves to a position representing the latch in the retracted state or the extended state, the position sensor is triggered by the trigger and sends a position signal to the controller, and the controller controls the drive motor to stop based on the position signal.

8. The door lock according to claim 7, further comprising a circuit board, wherein the circuit board is arranged above the rotating member and fixedly connected to the first housing; the position sensor is arranged on the circuit board; the circuit board is provided with an avoidance hole; and the circuit board is sleeved on the annular body of the positioning member through the avoidance hole, wherein the trigger is allowed to approach the position sensor.

9. The door lock according to claim 8, further comprising an outside-door module; wherein the outside-door module comprises the first housing, the rotating disc, the rotating member, the positioning member, the circuit board, the lock cylinder, and the drive motor; the first housing comprises a first upper housing and a first lower housing; the first upper housing and the first lower housing are mutually fastened together to form an accommodation cavity between the first upper housing and the first lower housing;

the rotating disc, the rotating member, the positioning member, the circuit board, the lock cylinder, and the drive motor are accommodated in the accommodation cavity; the rotating disc is rotatably arranged on the bottom plate central hole of the first lower housing; the rotating member is rotatably arranged on the rotating disc; the drive motor is fixed on the first upper housing; and the first housing is configured to be attached to and installed on an outer side of the door leaf.

10. The door lock according to claim 1, further comprising an inside-door module; wherein the inside-door module comprises a second housing; the second housing comprises a second base plate and a second face cover plate that are mutually fastened together; a manual knob is installed on the second face cover plate; the manual knob is in a transmission connection with an end of the transmission rod; when the manual knob is manually rotated inside the door, the manual knob is configured to drive the transmission rod to rotate forward or backward, wherein the latch is driven to retract or extend.

11. The door lock according to claim 10, further comprising a main magnetic component and a secondary magnetic group; wherein the main magnetic component and the secondary magnetic group are arranged on the inside-door module or the manual knob in an alternative manner; the secondary magnetic group comprises a first magnetic component and a second magnetic component, wherein the first magnetic component and the second magnetic component are configured to be magnetically paired with the main magnetic component, respectively;

from a top view, the first magnetic component and the second magnetic component are spaced apart; the first magnetic component is configured to be magnetically absorbed to the main magnetic component when the manual knob is rotated to a first position for driving the latch to retract, wherein the manual knob is kept at the first position; and the second magnetic component is configured to be magnetically absorbed to the main magnetic component when the manual knob is rotated to a second position for driving the latch to extend, wherein the manual knob is kept at the second position.

12. The door lock according to claim 11, further comprising a pair of first magnetic components, wherein from a top view, the pair of first magnetic components are located on a straight line and are spaced apart on both sides of the second magnetic component; the second magnetic component is located on a straight line perpendicular to a line connecting the pair of first magnetic components and passing through a midpoint of the line; a central angle, taking a rotatory central line passing through the manual knob as a circle center, between the second magnetic component and any one of the pair of first magnetic components is Φ; or further comprising a pair of second magnetic components, wherein from a top view, the pair of second magnetic components are located on a straight line and are spaced apart on both sides of the first magnetic component; the first magnetic component is located on a straight line perpendicular to a line connecting the pair of second magnetic components and passing through a midpoint of the line; a central angle, taking a rotatory central line passing through the manual knob as a circle center, between the first magnetic component and any one of the pair of second magnetic components is Φ.

13. The door lock according to claim 12, wherein the lock body further comprises a handle for pushing the latch to retract or extend, and the handle is in a transmission connection with the transmission rod; and the lock body further comprises a limiting mechanism, and the limiting mechanism is configured to constrain the handle to swing within an angle range of 0 to 10 degrees added based on Φ.

* * * * *